United States Patent
Wilson et al.

(10) Patent No.: US 11,944,040 B2
(45) Date of Patent: Apr. 2, 2024

(54) CLOSED LOOP COMBINE CLEANING FAN CONTROL

(71) Applicant: CNH Industrial America LLC, New Holland, PA (US)

(72) Inventors: Scott Wilson, Denver, PA (US); Seth Bich, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 475 days.

(21) Appl. No.: 17/165,079

(22) Filed: Feb. 2, 2021

(65) Prior Publication Data

US 2022/0240453 A1    Aug. 4, 2022

(51) Int. Cl.
*A01F 12/44*    (2006.01)
*A01D 41/127*    (2006.01)

(52) U.S. Cl.
CPC ........ *A01F 12/444* (2013.01); *A01D 41/1276* (2013.01); *A01F 12/446* (2013.01)

(58) Field of Classification Search
CPC ................. A01F 12/444; A01F 12/446; A01D 41/1276; A01D 41/00
See application file for complete search history.

(56) References Cited

U.S. PATENT DOCUMENTS

| | | | | |
|---|---|---|---|---|
| 2,682,951 A | * | 7/1954 | Hamburg | A01F 12/444 209/261 |
| 2,849,118 A | * | 8/1958 | Ashton | A01F 12/444 209/318 |
| 3,664,349 A | * | 5/1972 | Quick | A01F 12/444 415/121.2 |
| 4,259,829 A | | 4/1981 | Strubbe | |
| 4,307,732 A | * | 12/1981 | De Busscher | A01F 12/444 209/318 |
| 5,624,315 A | * | 4/1997 | Jonckheere | A01F 12/444 460/99 |

(Continued)

FOREIGN PATENT DOCUMENTS

| | | | | |
|---|---|---|---|---|
| CN | 102197748 A | * | 9/2011 | ............. A01F 12/18 |
| CN | 104737721 A | * | 7/2015 | ......... A01D 41/1276 |

(Continued)

OTHER PUBLICATIONS

Extended European Search Report for EP Application No. 22154758.1 dated Jun. 8, 2022 (five pages).

*Primary Examiner* — Arpad Fabian-Kovacs
(74) *Attorney, Agent, or Firm* — Peter K. Zacharias

(57) ABSTRACT

A cleaning system of a combine harvester includes a fan, a first valve member positioned within a first duct of the fan for throttling the flow of air through the first duct, a second valve member positioned within the second duct of the fan for throttling the flow of air through the second duct, a first actuator for adjusting a position of the first valve member, a second actuator for adjusting a position of the second valve member, first and second sensors for sensing air pressure at first and second sieves, and a controller. The controller is configured to receive the sensed air pressures from the sensors, compare the sensed air pressures with either each other or threshold values, and transmit instructions to one or both of the actuators to adjust the positions of one or both of the valve members.

21 Claims, 3 Drawing Sheets

(56) References Cited

U.S. PATENT DOCUMENTS

| | | | |
|---|---|---|---|
| 7,846,013 B1 * | 12/2010 | Diekhans | A01D 41/1276 |
| | | | 460/1 |
| 8,221,064 B2 | 7/2012 | Ricketts et al. | |
| 8,821,229 B2 | 9/2014 | Stan et al. | |
| 9,119,350 B2 | 9/2015 | Stan et al. | |
| 9,220,196 B2 * | 12/2015 | Baumgarten | A01D 41/127 |
| 2012/0184339 A1 | 7/2012 | Schulz | |
| 2019/0104687 A1 | 4/2019 | Thomas et al. | |
| 2019/0223375 A1 | 7/2019 | Missotten et al. | |
| 2019/0274253 A1 * | 9/2019 | Wold | A01F 12/444 |

FOREIGN PATENT DOCUMENTS

| | | | | |
|---|---|---|---|---|
| DE | 102011000130 A1 * | 7/2012 | | A01D 75/282 |
| EP | 0693252 A1 | 1/1996 | | |
| EP | 2510777 A1 * | 10/2012 | | A01D 41/1276 |
| RU | 2580420 C2 * | 4/2016 | | A01D 41/1276 |
| WO | WO-2021144701 A1 * | 7/2021 | | A01D 41/1276 |

\* cited by examiner

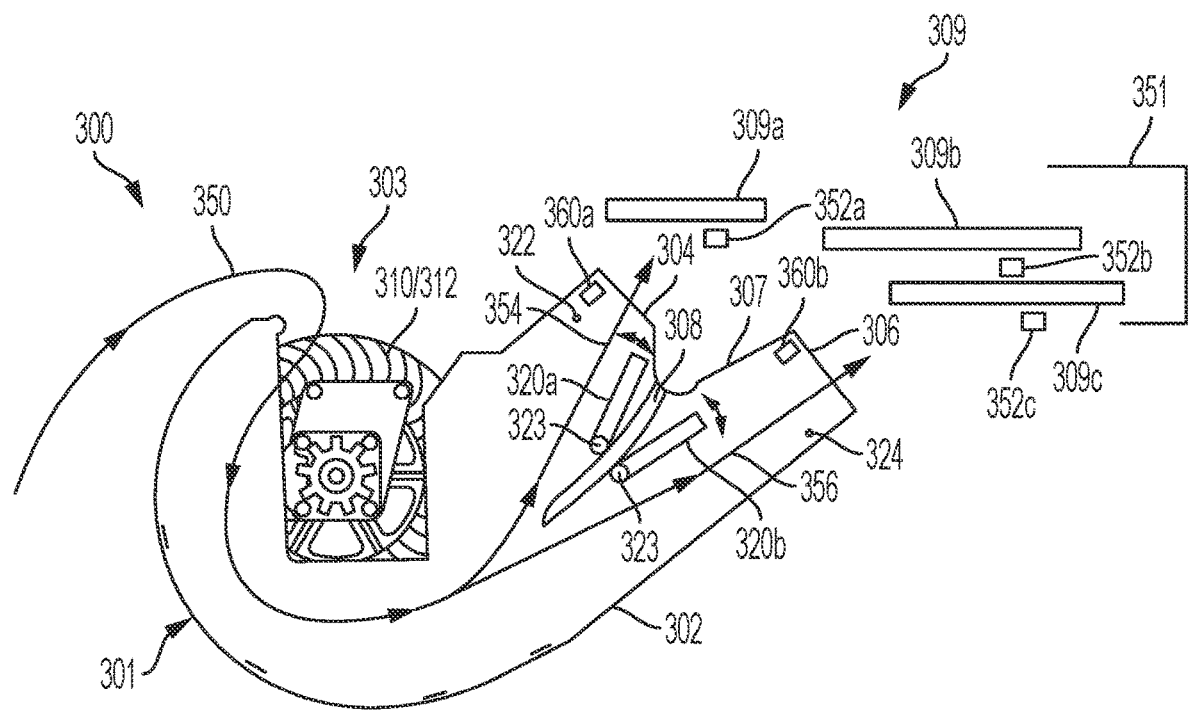
FIG. 3
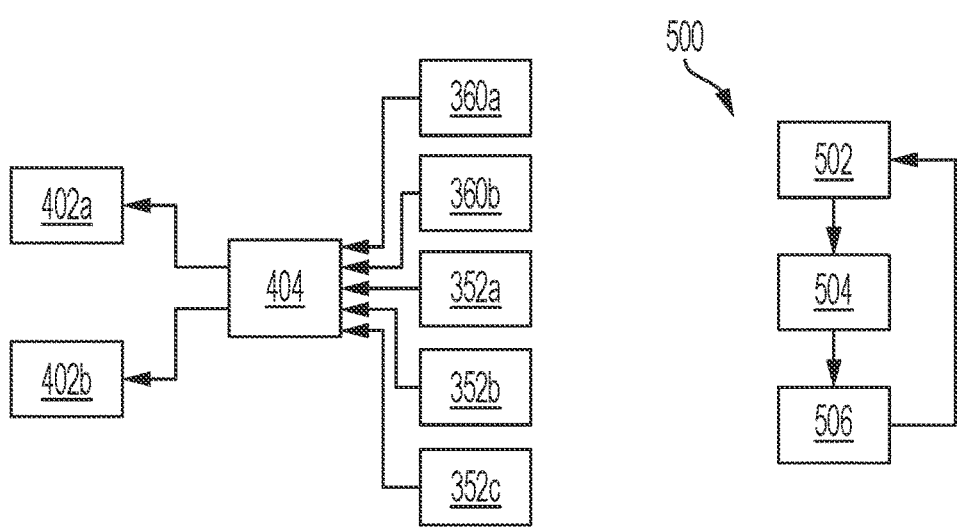
FIG. 4
FIG. 5

CLOSED LOOP COMBINE CLEANING FAN CONTROL

FIELD OF THE INVENTION

The present invention relates to a cleaning system of agricultural equipment, such as a combine harvester.

BACKGROUND OF THE INVENTION

As is described in U.S. Pat. No. 8,221,064 to CNH America LLC, which is incorporated by reference in its entirety and for all purposes, a cleaning system for a combine harvester includes a fan assembly that is configured to blow air through reciprocating sieves to carry lighter elements of material other than grain (MOG) or chaff away.

Transverse or cross-flow fans of various designs have been advantageously employed with agricultural combines to provide the air that is blown upwardly and rearwardly through the sieves to carry the chaff away from the grain and tailings deposited onto the cleaning system sieves. Transverse fans are useful in combine cleaning systems because such fans can produce a wide stream of air that can be directed upwardly toward the cleaning sieves of the combine cleaning systems but require relatively little space. Such fans, in typical agricultural combines, are disposed such that their air outlet ports are below the sieves of the cleaning system.

One problem with transverse fans is that the air blowing through the fan housing will receive air through its inlet in a uniform manner, however, the air can be unevenly distributed through the outlet ports of the fan. This problem may occur during the process of loading and unloading the sieves. The air within the fan housing will typically follow the path of least resistance, namely, toward the unobstructed portion of the sieves. This may be referred to in the art as a blowout condition.

It would be desirable to provide uniform distribution of air through the outlet ports of the fan assembly in order to improve cleaning efficiency, crop processing, and either limit or prevent a blowout condition. It would also be desirable to achieve the aforementioned uniform distribution of air in an automated manner.

SUMMARY OF THE INVENTION

The disclosure is generally directed to a cleaning system of a combine harvester.

According to one aspect of the invention, a cleaning system of a combine harvester comprises:
- a fan assembly comprising a housing, a fan rotor, at least one inlet duct through which air is delivered into the housing, a first duct leading to a first outlet port through which air is exhausted outside of the housing, and a second duct leading to a second outlet port through which air is also exhausted outside of the housing,
- a first valve member positioned within the first duct for throttling the flow of air through the first duct;
- a second valve member positioned within the second duct for throttling the flow of air through the second duct;
- a first actuator for adjusting a position of the first valve member within the first duct;
- a second actuator for adjusting a position of the second valve member within the second duct;
- a first sieve positioned adjacent the first outlet duct to receive a flow of air from the first outlet duct;
- a second sieve positioned adjacent the second outlet duct to receive a flow of air from the second outlet duct;
- a first sensor for either directly or indirectly sensing an air pressure at the first sieve;
- a second sensor for either directly or indirectly sensing an air pressure at the second sieve; and
- a controller for receiving the sensed air pressures from the first and second sensors, comparing the sensed air pressures with either each other or threshold values, and transmitting instructions to one or both of the first and second actuators to adjust the positions of one or both of the first and second valve members based upon the comparison.

According to another aspect of the invention, a method for operating a cleaning system comprises:
- receiving, at a controller, air pressure measurements from first and second pressure sensors located either at or near first and second sieves of the cleaning system;
- comparing, using the controller, the air pressure measurements with either each other or threshold valves; and
- adjusting a position of first and/or second valve members within first and second ducts of a fan housing of the cleaning system, respectively, by way of the controller, to change the air pressure at the first and second sieves.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 3 depicts a schematic cross-sectional side elevation view of a different cleaning assembly for use with the combine harvester of FIG. 2 or a different combine harvester.

FIG. 4 depicts a schematic diagram of a closed loop system for controlling air flow in the cleaning system of FIG. 3.

FIG. 5 depicts a flow chart showing an exemplary closed loop process for operating the cleaning system of FIG. 3.

DETAILED DESCRIPTION OF THE INVENTION

Figure 1:
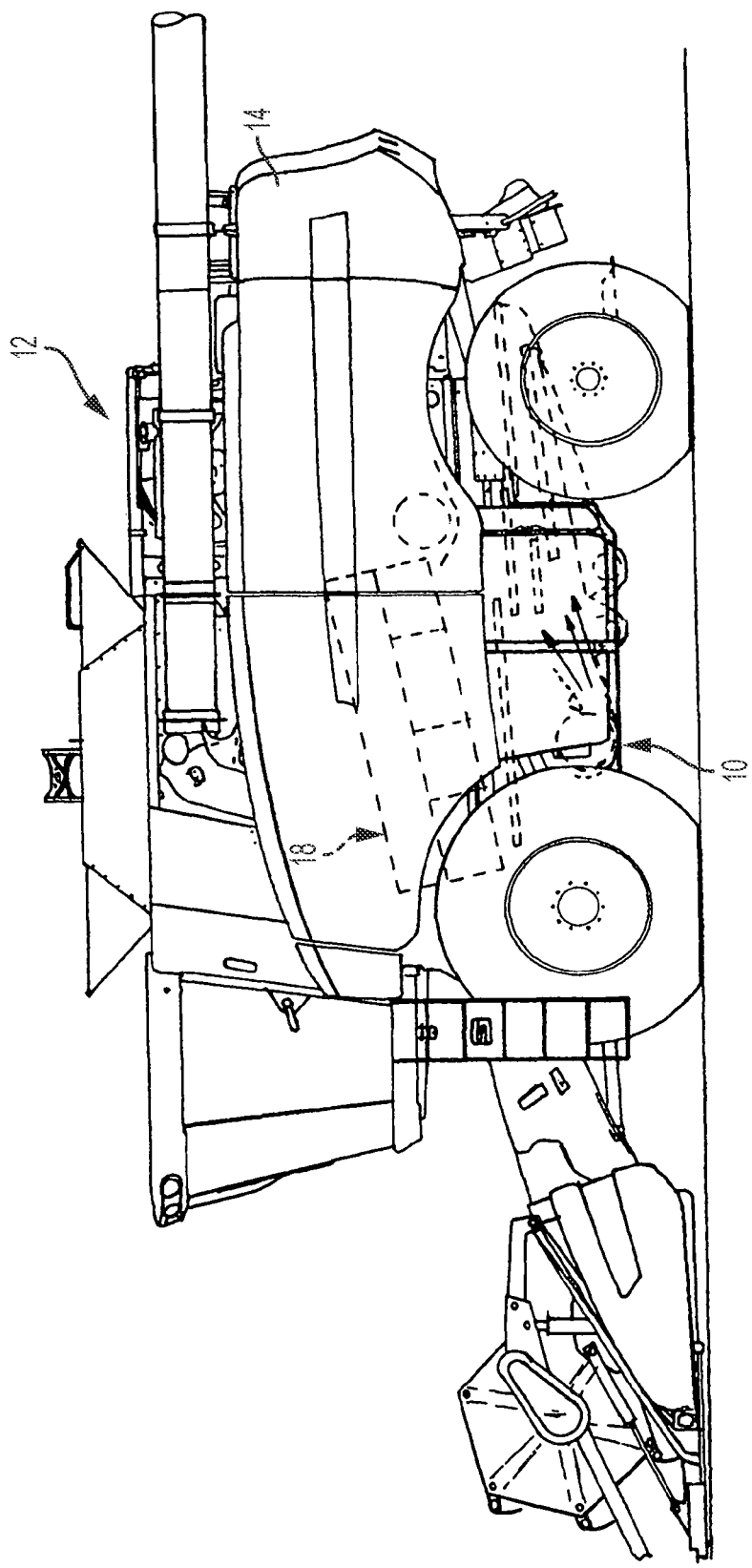
FIG. 1 a left side view of a conventional combine harvester, in which a transverse fan assembly is installed in conjunction with a cleaning system.

Corresponding reference characters indicate corresponding parts throughout the several views. The exemplification set out herein illustrates an embodiment of the invention, in one form, and such exemplification is not to be construed as limiting the scope of the invention in any manner.

It should be appreciated that, while the following discussion will be directed principally to cleaning system embodiments as employed in such a combine harvester, the cleaning systems of the present invention are not limited to use in such harvesters, but could equally as well be employed or utilized in or with other harvesters and equipment, or with other equipment or in other circumstances and situations, consistent with the principles and teachings expounded.

For convenience of reference and understanding in the following discussions, and with respect to the various drawings and their descriptions, the point of reference for the use of various terms that are hereafter employed, including "left", "right", "forward", "rearward", "front", "back", "top", and "bottom", should generally be considered to be taken from a point at the rear of the machine facing in its normal direction of travel, unless it is clear from the discussion and context that a different point of reference is appropriate. Any use of such terms should therefore be considered exemplary and should not be construed as limiting or introducing limitations.

Moreover, inasmuch as various components and features of harvesters and fan assemblies are of well-known design, construction, and operation to those skilled in the art, the details of such components and their operations will not generally be discussed in significant detail unless considered of pertinence to the present invention or desirable for purposes of better understanding.

Figure 2:
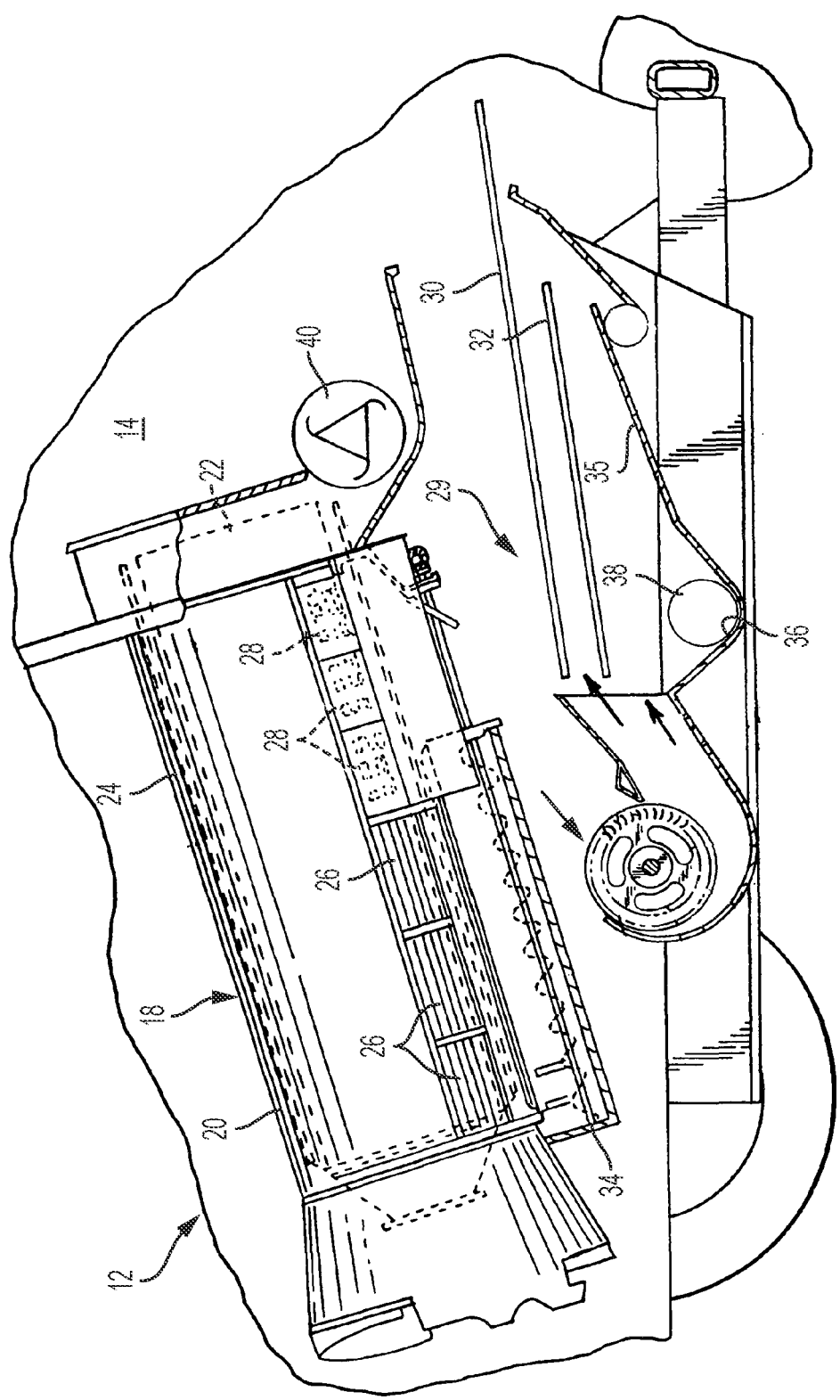
FIG. 2 is a partial cross-sectional view of a portion of the combine harvester of FIG. 1.

FIGS. 1 and 2, which are reproduced from U.S. Pat. No. 8,221,064, identify the general location of and depict a conventional transverse fan assembly 10 arranged in operable combination with a typical, conventional, self-propelled agricultural combine harvester 12 of the axial-flow type wherein crop material is threshed and separated while it is advanced by and along a generally longitudinally arranged rotor.

As is well known in the art, and as is better illustrated in FIG. 2, a threshing apparatus 18 of the combine harvester 12 includes a rotor assembly 20, including a relatively large diameter rotor 22 that is mounted within a threshing cage 24. Disposed about the cage 24 is a system of concaves 26 and separating grates 28 which, through the action of the rotor 22 and centrifugal force, act to separate grain material from other crop residue that is too large to pass through the concaves 26 and grates 28, sometimes hereafter referred to as straw.

The threshed grain material is delivered to a cleaning system 29 that includes a pair of vertically spaced apart cleaning sieves 30 and 32 while the straw is propelled rearwardly through the rotor assembly 20 where a conventional beater 40 acts upon the crop residue discharged from the rotor assembly 20. Beater 40 propels the crop residue from the rear of the rotor assembly 20 and throws it back for broad discharge from the rear end of the combine.

As may be observed from FIG. 2, an auger 34 moves the threshed grain material to the cleaning sieves 30 and 32, which sieves form part of the cleaning system 29 and are mounted for oscillation to separate grain from other larger pieces of threshed crop material. As the sieves 30 and 32 are vibrated or oscillated, the grain falls through the sieves 30 and 32 to an underlying clean grain pan 35 and into a clean grain trough or collector 36. An auger 38 directs the grain from the clean grain trough 36 into a hopper or grain bin (not shown) often housed generally directly behind the cab 12 (FIG. 1) within combine harvester body 14.

The threshed grain material that is too large to fall through the sieves 30 and 32 forms a relatively large crop mat or veil extending across substantially the entire sieve construction, as fan assembly 10 provides air that is blown upwardly and rearwardly, as denoted by the arrows, through sieves 30 and 32. Such air flow acts to blow lighter, non-grain elements, sometimes referred to as chaff, away from the crop mat remaining on the sieves 30 and 32 towards the rear of the harvester, where such chaff is handled in conventional and well-known manners.

The fan assembly 10 shown in FIG. 2 includes a single outlet port directed to sieves 30 and 32, however, other fan assemblies include multiple outlet ports, such as the fan shown in FIG. 3. For example, a first outlet port is positioned to direct air to a first sieve (commonly referred to as a "pre-sieve"), and a second outlet port is positioned to direct air to one or more additional sieves (e.g., chaffer sieves). As is described above, in fan assemblies having multiple outlet ports, one problem is that air can be unevenly distributed through the outlet ports during the loading and unloading processes.

Turning now to FIG. 3, there is illustrated a cleaning system 300 for a combine harvester, in accordance with an exemplary embodiment. Cleaning system 300 may be used with the combine of FIG. 1 or a different combine. The cleaning system 300 comprises a transverse fan assembly 301 and a cleaning shoe 309. The cleaning shoe comprises, at least in part, sieves 309a-309c. The fan assembly 301 may replace the fan assembly 10 of FIGS. 1 and 2 in the combine harvester. And, the sieves 309a-309c may replace the sieves 30 and 32.

The fan assembly 301 includes a housing 302 having a series of panels that are mounted together to form an interconnected housing. The fan assembly 301 includes an air inlet 303 at its top end. Unlike the fan assembly 10 of FIG. 2, the fan assembly 301 includes two exhaust or outlet openings 304 and 306 through which air is exhausted. Behind the front panel 307 is disposed a curved divider 308 positioned between the exhaust openings 304 and 306. The curved divider 308 serves to separate the inlet air flow 350 into two different exhaust flow streams, namely, exhaust air flow 354 and exhaust air flow 356.

The fan assembly 301 includes a single, unitary rotor 310. The rotor 310 includes a series of blades 312 for drawing air through the housing 302 from the inlet 303 to the outlets openings 304 and 306. The rotor 310 may be driven by a single drive.

A first valve member 320a is positioned within the duct 322 leading to the first outlet opening 304. First valve member 320a is pivotably connected to the divider 308 by a pivot point 323, bearing or hinge. The location of first valve member 320a within the duct 322 may vary, and, the location of the pivot point 323 may also vary. Valve member 320a may extend to a length that is either equal to the space in the duct 322 (as shown), or less than that space.

Although not shown in FIG. 3, an actuator 402a is configured to rotate the first valve member 320a about pivot point 323 and within the duct 322 (see arrows) based upon instructions received from a controller 404. Actuator 402a may be actuated either electrically or hydraulically, for example. Actuator 402a could be a solenoid, gear motor, or hydraulic piston, for example.

First valve member 320a is configured to be moved between a fully-closed position (not shown) and a fully open position (shown) by actuator 402a. In the fully-closed position, the first valve member 320a is rotated to a position such that it prevents the air flow 354 from being expelled through the outlet opening 304. In a fully-open position, the first valve member 320a is rotated to a position such that it does not prevent the air flow 354 from being expelled through the outlet opening 304. In operation, the first valve member 320a may be rotated to any predetermined position that is defined between the fully-open and fully-closed positions.

Similarly, a second valve member 320b is positioned within the duct 324 leading to the second outlet opening 306. Although not shown in FIG. 3, an actuator 402b is configured to rotate the second valve member 320b within the duct 324 (see arrows) based upon instructions received from controller 404. Valve member 320b and actuator 402b share the same structure and function as the valve member 320a and actuator 402a, and will not be described further.

Cleaning shoe 309 comprises a shoe housing 351 (only a portion of which is shown) to which the sieves 309a-309c are connected. The function of a cleaning shoe is well understood in the art. Located beneath each sieve 309a-309c is a pressure sensor 352a-352c, respectively. Each pressure sensor 352a-352c may be mounted directly to shoe housing 350. Each pressure sensor 352a-352c is configured to sense the air pressure being delivered by the fan 301 onto the respective sieves 309a-309c, respectively, via the outlet openings 304/306. Sensors 352a-352c transmit the air pressure readings to controller 404.

A second set of pressure sensors 360a and 360b are positioned within the ducts 322 and 324, respectively. Pressure sensors 360a and 360b sense the air pressure being delivered through the ducts 322 and 324, respectively. Pressure sensors 360a and 360b also sense any backpressure caused by loading of the sieves 309, which is communicated via ducts 322 and 324, respectively. Thus, for example, pressure sensor 360a can sense backpressure caused by crop loading at sieve 309a. And, pressure sensor 360a senses an air pressure that is indicative of the air pressure at sieve 309a. It can also be stated that air pressure sensor 360a is 'near' sieve 309a because it is positioned within the air duct that faces the sieve 309a.

Pressure sensors 352 and 360 may be any conventional, off-the-shelf, pressure transducer, pressure switch, or strain gauge, for example. Other styles of pressure sensors are known to those skilled in the art.

According to the embodiment shown, system 300 includes pressure sensors 360 and pressure sensors 352. According to another embodiment, system 300 includes pressure sensors 352, but not pressure sensors 360. According to yet another embodiment, system 300 includes pressure sensors 360, but not pressure sensors 352. Sensors 352 may be provided on a conventional cleaning system to serve other purposes such as monitoring the air pressure in the sieves, whereby the monitored air pressures are used for adjusting the sieve opening and fan speed based upon the monitored air pressure. Thus, cleaning system 300 may take advantage of existing sensors in a combine harvester.

FIG. 4 depicts a schematic diagram of a system 400 for controlling air flow in the cleaning system 300. As noted above, cleaning system 300 can include sensors 352 and/or sensors 360. Controller 404 receives pressure readings transmitted from sensors 352 and/or sensors 360. Controller 404 analyzes the pressure readings to determine the pressure level at the ducts 322 and 324 and/or the sieves 309 and identifies any imbalance in pressures between the ducts 322 and 324 and at the sieves 309. The controller 404 can include a memory having a table of valve positions related to desired air pressure values. Based upon the pressure readings transmitted from sensors 352 and/or sensors 360, the controller 404 activates the actuators 402a and/or 402b to adjust the rotational positions of the valves 320a and 320b between their open and closed positions, respectively, thereby affecting the air flow at the sieves 309. Communications between controller 404 and sensors and actuators may be either wired or wireless.

For example, sensor 352a may measure a higher air pressure than pressure sensors 352b and 352c indicating that the air pressure at sieve 309a is higher than the air pressure at sieves 309b and 309c. Accordingly, based upon the measured pressures, the controller 404 would either (i) move valve 320a closer toward its closed position (by way of actuator 402a), or (ii) move valve 320b closer toward its open position (by way of actuator 402b), in order to increase the air flow to sieves 309b and 309c. Controller 404 may be configured to (i) maintain equal air pressure at the sieves, (ii) maintain the air pressure at each sieve at a pre-defined pressure, or (iii) maintain the air pressure at the sieves at a pre-defined differential (e.g., 60% air flow to sieve 309a, and 40% air flow to sieves 309b and 309c).

FIG. 5 depicts a flow chart showing an exemplary closed loop method or routine 500 for operating the cleaning system of FIG. 3. According to routine 500, at step 502, sensors 352 and/or 360 transmit the local air pressures to controller 404. At step 504, controller 404 determines the air pressure at each sieve 309 (either directly via sensors 352 or indirectly via sensors 360), and then calculates a deviance (i.e., an error) from a desired air pressure at each sieve 309 using an algorithm. At step 506, and if required due to the occurrence of a deviance, the controller 404 transmits instructions (in the form of an error signal) to actuators 402 in order to change the position of one or more valves 320 within their ducts, in an effort to maintain the air pressure at the sieves at the desired air pressures. The routine 500 then returns to step 502 to monitor the local air pressures that were adjusted at step 506, and proceeds to adjust the valves 320 again at step 506, if necessary. The controller 404 may utilize a proportional-integral-derivative (PID) loop to eventually reach the desired air pressure at each sieve 309. It should be understood that system 400 is a closed loop system.

It is to be understood that the operational steps are performed by the controller 404 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 404 described herein is implemented in software code or instructions which are tangibly stored on a tangible computer readable medium. Upon loading and executing such software code or instructions by the controller 404, the controller may perform any of the functionality of the controller described herein, including any steps of the methods described herein.

The term "software code" or "code" used herein refers to any instructions or set of instructions that influence the operation of a computer or controller 404. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A cleaning system of a combine harvester comprising:
a fan assembly comprising a housing, a fan rotor at least partially positioned within the housing, at least one inlet duct through which air is delivered into the housing, a first duct leading to a first outlet port through which air is exhausted outside of the housing, a second duct leading to a second outlet port through which air is also exhausted outside of the housing, and a stationary partition disposed between and at least partially forming the first and second ducts;
a first valve member positioned within the first duct for throttling the flow of air through the first duct;
a second valve member positioned within the second duct for throttling the flow of air through the second duct;
a first actuator for adjusting a position of the first valve member within the first duct;
a second actuator for adjusting a position of the second valve member within the second duct;
a first sieve positioned adjacent the first outlet port to receive a flow of air from the first duct;
a second sieve positioned adjacent the second outlet port to receive a flow of air from the second duct;
a first sensor for either directly or indirectly sensing an air pressure at the first sieve;
a second sensor for either directly or indirectly sensing an air pressure at the second sieve; and
a controller for receiving the sensed air pressures from the first and second sensors, comparing the sensed air pressures with either each other or threshold values, and transmitting instructions to both of the first and second actuators to adjust the positions of both of the first and second valve members based upon the comparison and thereby equalize the flow of air through the first and second ducts toward the first and second sieves, respectively.

2. The cleaning system of claim 1, wherein each sieve includes openings through which grain can pass.

3. The cleaning system of claim 1, wherein the first sensor is mounted to a housing for the first sieve, and the second sensor is mounted to a housing for the second sieve.

4. The cleaning system of claim 1, wherein the first sensor is at least partially positioned within the first duct, and the second sensor is at least partially positioned within the second duct.

5. The cleaning system of claim 1, wherein each sensor is a pressure transducer, a pressure switch, or a strain gauge.

6. The cleaning system of claim 1, wherein each valve member is pivotably connected to the housing of the fan assembly.

7. The cleaning system of claim 1, wherein the first sensor is positioned directly below the first sieve, and the second sensor is positioned directly below the second sieve.

8. The cleaning system of claim 1, wherein the first sensor is positioned downstream of the first valve member, and the second sensor is positioned downstream of the second valve member.

9. The cleaning system of claim 1, wherein the sieves form part of a cleaning shoe.

10. The cleaning system of claim 1, wherein the controller employs a PID loop for adjusting the position of the first and/or second valve members until the sensed air pressures arrive at predetermined values.

11. The cleaning system of claim 1, wherein the controller is configured to adjust the position of the first and/or second valve members until the sensed air pressures are either equivalent or a difference between the sensed air pressures is maintained within a predefined threshold.

12. A combine harvester comprising the cleaning system of claim 1.

13. The combine harvester of claim 12 further comprising a rotor and concave that are positioned at an elevation above the cleaning system.

14. The cleaning system of claim 1, wherein the stationary partition is disposed between the first and second valve members.

15. A method for operating a cleaning system of a combine harvester, said method comprising:
receiving, at a controller, air pressure measurements from first and second pressure sensors located either at or near first and second sieves of the cleaning system;
comparing, using the controller, the air pressure measurements with either each other or threshold valves; and
adjusting a position of first and second valve members within first and second ducts of a fan housing of the cleaning system, respectively, by way of the controller, to change equalize a flow of air through the first and second ducts toward the first and second sieves, respectively.

16. The method of claim 15, further comprising, following the adjusting step, receiving, at the controller, further air pressure measurements at the first and second sieves of the cleaning system.

17. The method of claim 15, wherein the first sensor is mounted to a housing for the first sieve, and the second sensor is mounted to a housing for the second sieve.

18. The method of claim 15, wherein the first sensor is at least partially positioned within the first duct, and the second sensor is at least partially positioned within the second duct.

19. The method of claim 15, wherein each valve member is pivotably connected to the fan housing.

20. The method of claim 15, wherein the method comprises operating the cleaning system while threshing grain using a rotor and concave of the combine harvester.

21. The method of claim 15, wherein the fan housing comprises a stationary partition that (i) is disposed between and at least partially forms the first and second ducts and (ii) is disposed between the first and second valve members.

* * * * *